(12) United States Patent
Gupta et al.

(10) Patent No.: US 8,739,170 B1
(45) Date of Patent: May 27, 2014

(54) MANAGING REQUESTS FOR COMPUTING CAPACITY

(75) Inventors: Diwakar Gupta, Redmond, WA (US);
Eric Paul Wei, Seattle, WA (US); James Alfred Gordon Greenfield, Western Cape (ZA); Varun Madan, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 711 days.

(21) Appl. No.: 12/827,828

(22) Filed: Jun. 30, 2010

(51) Int. Cl.
*G06F 9/46* (2006.01)

(52) U.S. Cl.
USPC .......................................................... 718/104

(58) Field of Classification Search
None
See application file for complete search history.

(56) References Cited

U.S. PATENT DOCUMENTS

| | | | |
|---|---|---|---|
| 7,792,944 B2 * | 9/2010 | DeSantis et al. | 709/223 |
| 8,249,904 B1 * | 8/2012 | DeSantis et al. | 705/7.12 |
| 2007/0240160 A1 | 10/2007 | Paterson-Jones et al. | |
| 2008/0059557 A1 * | 3/2008 | DeSantis et al. | 709/201 |
| 2009/0049443 A1 * | 2/2009 | Powers et al. | 718/100 |
| 2011/0078705 A1 * | 3/2011 | Maclinovsky et al. | 719/318 |
| 2011/0173637 A1 * | 7/2011 | Brandwine et al. | 719/314 |

OTHER PUBLICATIONS

U.S. Appl. No. 12/334,022 titled "Managing Use of Program Execution Capacity," filed Dec. 12, 2008, 69 pages.

* cited by examiner

*Primary Examiner* — H S Sough
*Assistant Examiner* — William C Wood
(74) *Attorney, Agent, or Firm* — Knobbe, Martens, Olson & Bear, LLP

(57) ABSTRACT

Systems and methods are described for managing requests for computing capacity from a provider of computing resources. The computing resources may include program execution capabilities, data storage or management capabilities, network bandwidth, etc. In some implementations, a user can request that computer resources be reserved for guaranteed availability by the user (or others authorized by the user) during a future usage time period. For example, the user can request a desired amount of program execution capacity. The usage period can be flexibly chosen to meet the user's needs. The request can specify, for example, that a particular program be executed during the usage period, that only certain users be authorized to have access to the guaranteed availability computer resources, and so forth. The provider may charge a fee for the request and/or fees for access or use of the guaranteed availability computer resources during the usage period.

33 Claims, 6 Drawing Sheets

MANAGING REQUESTS FOR COMPUTING CAPACITY

BACKGROUND

Companies and organizations operate computer networks that interconnect numerous computing systems to support their operations. The computing systems can be located in a single geographical location (e.g., as part of a local network) or located in multiple distinct geographical locations (e.g., connected via one or more private or public intermediate networks). Data centers may house significant numbers of interconnected computing systems, such as, e.g., private data centers are operated by a single organization and public data centers operated by third parties to provide computing resources to customers. Public and private data centers may provide network access, power, hardware resources (e.g., computing and storage), and secure installation facilities for hardware owned by the data center, an organization, or by other customers.

To facilitate increased utilization of data center resources, virtualization technologies may allow a single physical computing machine to host one or more instances of virtual machines that appear and operate as independent computer machines to a connected computer user. With virtualization, the single physical computing device can create, maintain or delete virtual machines in a dynamic manner. In turn, users can request computer resources from a data center and be provided with varying numbers of virtual machine resources on an "as needed" basis or at least on an "as requested" basis.

As the scale and scope of data centers has increased, the task of provisioning, administering, and managing the physical and virtual computing resources of the data center has become increasingly complicated.

BRIEF DESCRIPTION OF THE DRAWINGS

Throughout the drawings, reference numbers may be reused to indicate correspondence between referenced elements. The drawings are provided to illustrate example embodiments described herein and are not intended to limit the scope of the disclosure.

DETAILED DESCRIPTION

Figure 1:
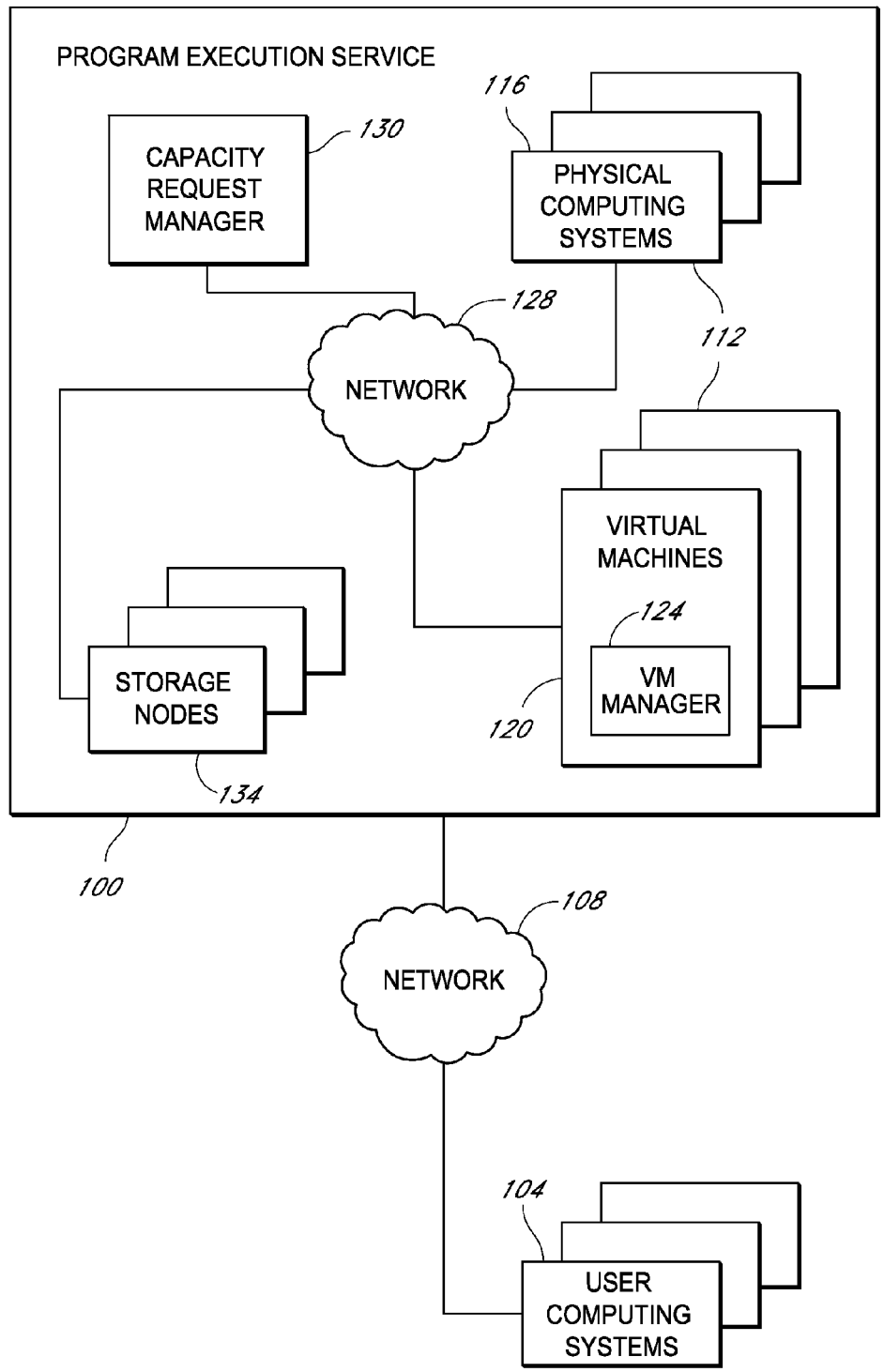
FIG. 1 is a network diagram schematically illustrating an example of a program execution service that can provide computing resources to multiple user computing systems via a communication network.

Embodiments of systems and methods are described for managing requests for computing capacity from a provider of computing resources. Illustratively, the computing resources may include program execution capabilities, data storage or management capabilities, network bandwidth, etc. In some implementations, a user can request that computer resources be reserved for guaranteed availability by the user (or others authorized by the user) during a future usage time period. For example, the user can request that a desired amount of program execution capacity be guaranteed to be made available to the user (or authorized users) during the future usage period. The computing resource provider can determine which of the provider's computer resources can be guaranteed to be made available to meet the user's request and can allocate those computer resources to the user during the requested usage period.

The usage period and/or other parameters of the user's request may be selected with a high degree of flexibility to meet the user's needs for the computer resources. The user's request may include one or more user-selectable parameters to specify preferences, restrictions, and/or requirements by the user. For example, the user's request can specify that a particular program (or programs) be executed during the usage period, that only certain users be authorized to have access to the guaranteed availability computer resources during the usage period, that the usage period have a desired start date, end date, and/or duration, and so forth. In some implementations, the computing resource provider places few or no restrictions on the range of request parameters that can be submitted by a user. As one possible example, the user may be able to request any desired usage period duration and not be limited to selecting from a small number of fixed duration usage periods (e.g., either a one year duration or a three year duration) set by the computing resource provider.

In certain fee-based implementations, the provider of the computer resources may charge a reservation fee to the user for the request (e.g., when the request is granted) and/or a usage fee for providing use of the guaranteed availability computer resources during the usage period. Various types or tiers of fee arrangements are possible. For example, guaranteed availability computer resources may be requested for immediate use by the user ("on-demand resources"). In some such cases, the user might not pay a reservation fee but might pay higher usage fees. As another example, a user might reserve computer resources for guaranteed availability during a future usage period ("reserved resources"). The user might be charged a reservation fee for making the reservation and also charged a usage fee based on the amount of computer resources actually used during the usage period. In some such cases, the usage fee for the reserved resources may be discounted from the usage fee for on-demand resources and/or the reservation fee may be charged closer in time to the usage period rather than closer to the time the request was made. In another example, the computer resource provider may allow users to bid on unused computer resources ("spot resources"). In some such cases, the computer resource provider may set a spot price that changes based on supply and demand for the resources, and the resources may be made available to those users whose bid meets or exceeds the spot price.

Various aspects of the disclosure will now be described with regard to certain examples and embodiments, which are intended to illustrate but not to limit the disclosure.

FIG. 1 is a network diagram schematically illustrating an example of a program execution service 100 that can provide computing resources to multiple user computing systems 104 via a communication network 108. For example, the program execution service 100 can manage requests from a user to execute a program, or set of programs, on behalf of the user. At least some of the user computing systems 104 may be remote from the program execution service 100. In this example, users can use the computing systems 104 to access the program execution service 100 over the communication network 108. The network 108 may, for example, be a publicly accessible network of linked networks, possibly operated by various distinct parties, such as the Internet. In other embodiments, the network 108 may be a private network, such as, for example, a corporate or university network that is wholly or partially inaccessible to non-privileged users. In still other embodiments, the network 108 may include one or more private networks with access to and/or from the Internet.

The program execution service 100 provides a variety of functionality for managing execution of programs for multiple users. In the example illustrated in FIG. 1, the program execution service 100 comprises a plurality of computing nodes 112 that can execute programs on behalf of the users. The computing nodes 112 may comprise one or more physical computing systems 116 and/or one or more virtual machines 120 that are hosted on one or more physical computing systems. For example, a host computing system may provide multiple virtual machines 120 and include a virtual machine ("VM") manager 124 to manage those virtual machines (e.g., a hypervisor or other virtual machine monitor).

In the example illustrated in FIG. 1, each of the computing nodes 112 has some amount of computing resources available for executing one or more programs. Each computing node 112 may be configured to provide a specific amount of program execution capacity, which may be measured, for example, by a combination of one or more of processing capacity (e.g., number and/or size of processing units), memory capacity, storage capacity, network bandwidth capacity, non-network communication bandwidth, etc. In some embodiments, the program execution service 100 may provide preconfigured computing nodes 112, with each preconfigured computing node having similar and/or equivalent amounts of resources available for executing programs on behalf of users. In other embodiments, the program execution service 100 may provide a selection of various different computing nodes 112 from which a user may choose for executing programs on behalf of the user. In some such embodiments, the computing nodes 112 may have varying amounts and/or types of computing resources (e.g., size, speed and/or type of processing units; number of processing units; amount of memory and/or storage; platform configuration, such as 32-bit or 64-bit, operating system, etc.).

The program execution service 100 may provide user computing systems 104 with access to storage nodes 134 that provide mass storage of data, programs, and other user information. The storage nodes 134 may comprise any type of persistent data storage, for example non-volatile memory devices such as, e.g., hard disk drives, optical disk drives, etc. In the example illustrated in FIG. 1, the computing nodes 112 can access the storage nodes 134 via a network 128. The network 128 may include multiple networking devices (not shown) such as, e.g., switches, edge routers, core routers, etc. The network 128 may, but need not be, a different network than the network 108 shown in FIG. 1.

Users of the program execution service 100 can interact with the program execution service 100 via a capacity request manager 130 to request preferred and/or required resources of the program execution service (e.g., program execution capacity and/or storage resources). The capacity request manager 130 can be connected to the computing nodes 112 and the storage nodes 134 via the network 128. The capacity request manager 130 can receive requests for guaranteed availability resources from the user computing systems 104 over the network 108. A user may request via the capacity request manager 130 that the service 100 provide one or more computing nodes for execution of a program (or programs) on behalf of the user (or other users authorized by the user). In various embodiments, computing resources may be specified at the time of a request for execution of programs on behalf of a user and/or at one or more other times, such as when a user registers and/or subscribes to use services of the program execution service 100. In some embodiments, the capacity request manager 130 may provide subscription and/or registration services to one or more users, such that users may specify information related to one or more programs to execute on behalf of a user (e.g., programs, source code, addressable locations of one or more programs, etc.), account information (e.g., user name, billing information, etc.), terms of use, etc. In some embodiments, after a user interacts with the capacity request manager 130 to subscribe and/or register for services, the user may be issued one or more request identifiers (e.g., keys, tokens, user names, passwords, etc.) that are associated with the user and are to be used in conjunction with executing programs on behalf of the user. In other embodiments, a module other than the capacity request manager 130 may be provided to perform various operations related to subscription and/or registration services of the program execution service 100.

In some embodiments, the capacity request manager 130 is executed or embodied by one or more physical or virtual computing systems. For example, in some embodiments, a server computing system that has components including a CPU, I/O components, storage, and memory may be used to execute the capacity request manager 130. The I/O components include a display, a network connection to the network 128, a computer-readable media drive, and other I/O devices (e.g., a keyboard, a mouse, speakers, etc.). An embodiment of the capacity request manager 130 can be stored as one or more executable program modules in the memory of the server, and the capacity request manager 130 can interact with computing nodes 112 (e.g., physical computing systems 116 and/or VMs 120) over the network 128. The capacity request manager 130 can receive requests from users for computing resources of the program execution service 100 via the network 108.

Figure 2A:
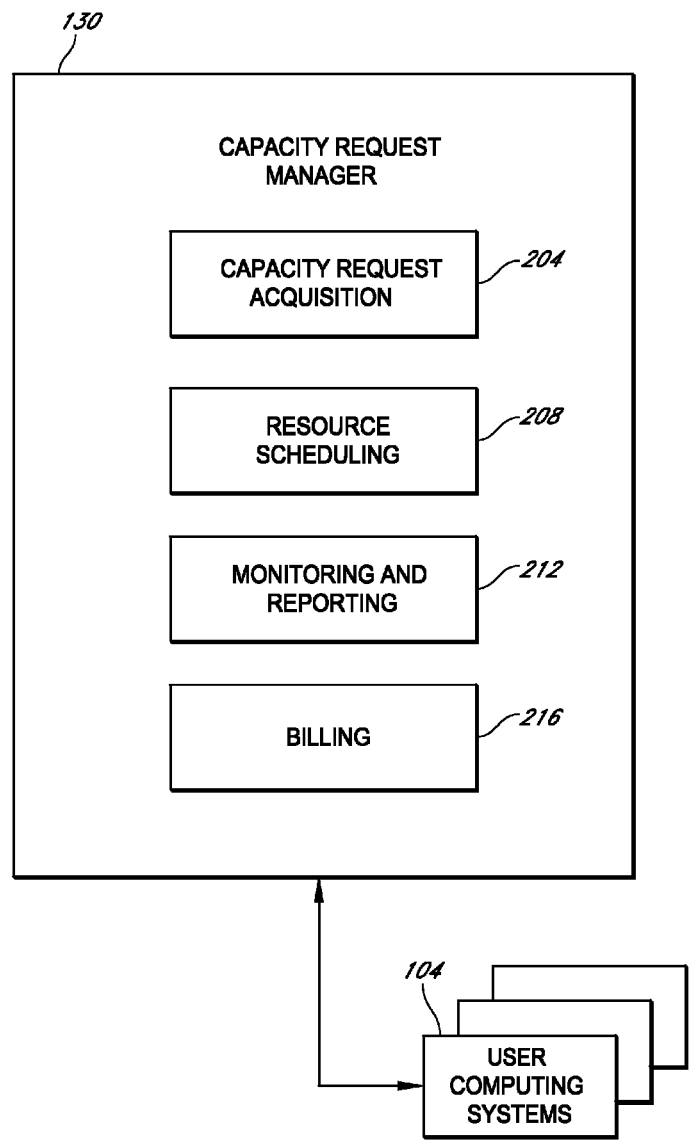
FIG. 2A is a block diagram schematic of illustrative components of a capacity request manager configured to manage requests for computing resources by users of a program execution service.

FIG. 2A is a block diagram schematic of illustrative components of an embodiment of the capacity request manager 130 that is configured for managing requests for execution of programs on behalf of users. In this embodiment, the capacity request manager includes a capacity request acquisition module 204, a resource scheduling module 208, monitoring and reporting module 212, and billing module 216.

The capacity request acquisition module 204 receives requests from users for computing resources of the program execution service 100 such as, e.g., a request that program execution capacity be guaranteed to be available to the user during a usage period. The user may request that program execution capacity be made available immediately, may request that program execution capacity be initiated at a future time, or may request program execution capacity be guaranteed available based on other criteria. Requests for program execution capacity may be received by the capacity request acquisition module 204 in various ways. For example, a request can be received directly from a user (e.g., via an interactive console or other GUI provided by the program execution service), from an executing program of a user that automatically initiates the execution of other programs or other instances of itself, from a program that interacts with the capacity request manager via an Application Programming Interface ("API") provided by the program execution service (e.g., an API that uses Web services), and so forth.

Requests for guaranteed availability of computing resources may include a number and/or type of computing nodes, a minimum and/or maximum number of computing nodes to use, a usage period during which availability of the computing nodes is to be guaranteed, an expiration time for the request, etc. The request may specify that only a certain user (or users) be granted access to the guaranteed availability computing nodes during the usage period or that only a certain program (or programs) be executed on the guaranteed availability computing nodes during the usage period. The request may indicate that certain users are to be denied access to the guaranteed availability computing nodes during the usage period. The request for guaranteed availability may include other types of preferences, requirements, and/or restrictions (e.g., amount of storage capacity or network bandwidth, geographical and/or logical location for the nodes, termination criteria, etc.).

The request for guaranteed availability computing resources may specify a usage period during which the computing resources are to be guaranteed available to the user. The usage period may be specified in various manners in various embodiments. For example, the usage period may indicate a specified duration of time (e.g., a number of hours, days, weeks, months, years, etc.) beginning at an initial time and ending at an expiration time. The initial time and/or expiration time may include time of day (e.g., 7:00 a.m.) and date (e.g., Jan. 23, 2010). The initial time can be at some future time, for example, one or more hours, days, weeks, or years in the future. In some cases, the future usage period may begin later than the time of the request (or confirmation of the request) by at least a certain period of time such as, e.g., by at least one hour, one day, one week, one month, or more in the future.

In some implementations of the capacity request manager 130, a delay period may occur between a time that a request for computing capacity is received by the capacity request manager 130 and a time that the request is granted or a time that a confirmation is provided to the user. For example, the delay period may occur due to various processing operations, management operations, accounting operations, etc. performed by the capacity request manager 130 or the program execution service 100. In some such implementations, the requested usage period refers to a time period that occurs after (or substantially after) such delay periods are taken into account. For example, in certain implementations, the delay period may be seconds, minutes, or a few hours. In certain such implementations, the initial time of a requested future usage period may be a time in the future that exceeds such a delay period. The initial time in certain other implementations of the capacity request manager 130 may be the time at which the user's request is submitted, received, or granted by the program execution service 100.

In some cases, the request may indicate that the usage period is not to expire until specifically terminated by the user (e.g., there may be no set expiration time). The duration may be in a range from one hour to one week, one week to one month, one or more months, one or more years, or some other duration. In some embodiments, the usage period may include a combination of the above (or other) factors to provide the user with a high degree of flexibility in scheduling the guaranteed availability computer resources.

After the request for guaranteed availability computing nodes is received by the capacity request acquisition module 204, the resource scheduling module 208 can schedule and allocate computing nodes to fulfill the request. For example, after receiving a request for guaranteed availability of a certain number of computing nodes, the resource scheduling module 208 may determine one or more computing nodes 112 to use. In some embodiments, the determination of the computing nodes 112 to be used is performed at the time of the request even if the request is for future availability. In other embodiments, the determination of the guaranteed availability computing nodes is deferred to a later time such as, e.g., prior to the beginning of the usage period so that the determination can be based on information that is then available.

The resource scheduling module 208 may allocate one or more computing nodes from the computing nodes 112 for guaranteed availability by the user during a requested usage period. In some embodiments, one or more specific computing nodes 112 (e.g., one or more specific physical computing nodes 116 and/or virtual computing nodes 120) are allocated for priority use by the user (or authorized users) for the entire usage period.

In other embodiments, rather than allocate specific computing nodes to a specific user for the usage period, the resource scheduling module 208 may instead allocate computing nodes from a computing node pool. The computing node pool may include an appropriate amount of computing nodes with sufficient resources to satisfy requests for program execution by the user or authorized users. In some such embodiments, after a request is received during the usage period to execute one or more programs, an appropriate amount of computing nodes sufficient to execute the one or more programs may be selected from the computing node pool, and program execution is initiated on the selected nodes. After the selected amount of computing nodes are no longer used for executing the request (e.g., after termination and/or completion of the requested execution), those computing nodes may be returned to the computing node pool for use by the user or other authorized users during the usage period. In some implementations, nodes of the computing node pool are allocated for dedicated, exclusive, or preferential use by the user (or authorized users). In some such implementations, nodes of the computing node pool that are not in use by the user (or authorized users) may be allocated to other users for program execution, and if such nodes are needed by the user (or authorized users) to fulfill the capacity guarantee, the other user's program can be terminated.

During the usage period, the user (or authorized users) may submit requests to the capacity request manager 130 for execution of one or more programs on the guaranteed availability computing nodes. Requests for program execution may include various information to be used in the initiation of the execution of one or more programs, such as an executable or other copy of a program to be executed, an indication of a program that was previously registered or otherwise supplied for execution, and a number of instances of the program that are to be executed simultaneously (e.g., expressed as a single desired number of instances, as a minimum and maximum number of desired instances, etc.). The request may specify a number and/or type of computing nodes for execution of a program, a minimum and/or maximum number of computing nodes to use, an expiration time for the request, a preferred execution time and/or time period of execution, etc. The request may include other types of preferences and/or requirements for execution of one or more programs (e.g., resource allocation, geographical and/or logical location for execution, proximity of execution to other programs and/or computing nodes, timing-related criteria, termination criteria, etc.).

The resource scheduling module 208 may determine which of the guaranteed availability computing nodes to use for execution of each program instance in a variety of ways, including based on any preferences, restrictions, and/or requirements specified in the request or otherwise specified for the program and/or associated user. For example, if criteria are determined for preferred and/or required resources for execution of a program instance (e.g., memory and/or storage; CPU type, cycles or other performance metric; network capacity; platform type, etc.), the determination of an appropriate computing node to execute a program instance may be based at least in part on whether a computing node has sufficient resources available to satisfy those resource criteria.

During the usage period, requests received by the capacity request acquisition manager 204 to execute programs on behalf of the user or authorized users on the guaranteed availability computing nodes may result in initiation of program execution on one or more of the allocated computing nodes. In some cases, sufficient requests for program execution may be received during the usage period such that all of the guaranteed availability computing nodes are in use (e.g., executing programs). Further requests for program execution received during the usage period may be refused or may be held or queued by the resource scheduling module 208 until one or more of the guaranteed availability computing nodes becomes available.

In some embodiments, the resource scheduling module 208 may perform one or more management operations with respect to fulfilling requests, such as, for example, enforcing usage period or other restrictions associated with requests, freeing-up computing resources to fulfill the requests, authorizing and/or authenticating the requests and/or the requesting users, etc. For example, in some cases, the request from the user may specify that only a certain user (or users) is authorized to have access to the guaranteed availability computing nodes during the usage period. In some cases, the request from the user may specify that only one or more specified programs be executed on the guaranteed availability nodes during the usage period. Other restrictions can include restrictions on duration of execution of a program, restrictions on fees incurred during execution of the program, etc. Combinations of one or more of the above restrictions (or other restrictions) may be specified by the user and checked by the capacity request manager 130 before permitting access to the guaranteed availability computing nodes.

In some implementations, after the usage period expires, the resource scheduling module 208 releases the guaranteed availability computing nodes (e.g., dedicated computing nodes or nodes in a computing node pool) for use by others. In some such implementations, programs that are executing when the usage period expires are terminated. In other implementations, such executing programs are not terminated and are allowed to continue execution until a higher priority user requests access to the computing node.

In the embodiment illustrated in FIG. 2A, the monitoring and reporting module 212 monitors and tracks usage of the guaranteed availability computing nodes during the usage period and reports information and statistics on the usage to the user. For example, the monitoring and reporting module 212 may track usage patterns of users executing programs on the guaranteed availability computing nodes. Usage patterns can include the number or identity of users accessing the guaranteed availability nodes, the start/end times and durations of program execution, and/or other user-specified patterns or diagnostics. In some such embodiments, the monitoring and reporting module 212 may provide interactive feedback to the user including, e.g., indications of when and/or for how long programs may be likely to execute on the guaranteed availability computing nodes, actual or predicted demand for the guaranteed availability nodes, etc. In some embodiments, the monitoring and reporting module 212 can generate a report detailing or summarizing the usage statistics and communicate the report to the user via electronic mail or provide access to the report, usage statistics, or interactive feedback via Web services.

Some program execution services 100 may be fee-based such that the service executes programs or allocates computing resources on behalf of a user in exchange for payment of one or more fees by that user. In some fee-based services, the capacity request manager 130 may optionally include the billing module 216 schematically illustrated in FIG. 2A. For example, in some embodiments, fees may be charged to a user based on an amount and/or type of program execution capacity allocated for executing one or more programs on behalf of a user, such as based on one or more of a number of processing units, an amount of memory, an amount of storage, an amount of network resources, etc., allocated for executing programs of the user. In some embodiments, fees may be based on other factors, such as various characteristics of the computing resources used to execute programs, such as, for example, based on CPU capabilities or performance, platform type (e.g., 32-bit, 64-bit, etc.), etc. In some embodiments, fees may be charged on the basis of a variety of use factors, such as a price per use of the service, a price per unit of time that computing services are used, a price per storage used, a price per data transferred in and/or out, etc.

Fees may be based on various other factors, such as related to requests for guaranteed availability of program execution capacity and/or various properties related to executing programs (e.g., continuity of execution, fault tolerance, etc.). In at least some embodiments, a program execution service may offer one or more of various tiers, types and/or levels of services or functionality for executing programs on behalf of multiple users, and in some such embodiments, various fees may be associated with the various tiers, types and/or levels of services. The billing module 216 can monitor and track usage of the computer resources and calculate fees due for the usage.

The user may be charged a fixed fee payment (e.g., upfront or periodically billed) for reserving computing capacity and, in some cases, is charged other use fees (e.g., variable fees associated with use of various resources, such as electricity, physical rack space, network utilization, etc.). As an example, a user who makes a request for guaranteed availability of computing resources during a usage period may be charged a reservation fee when the request is made or when the request is granted by the program execution service 100. The reservation fee may be based on, for example, the amount of resources requested, the start time and/or duration of the usage period, whether the service will be required to purchase additional computing hardware to fulfill the request, etc. For example, the reservation fee may be higher if the start time is in the near future than if the start time is farther out. In addition, the user (or authorized users) may be charged a usage fee for utilizing the guaranteed availability resources during the usage period. For example, an authorized user that requests, during the usage period, execution of a program on the guaranteed availability computing nodes, may be charged a usage fee based on, for example, the duration of execution of the program, the type of the resources used to execute the program, etc. As discussed above, various types or tiers of fee arrangements are possible. For example, a user that requests on-demand resources for immediate use may not be charged a reservation fee but may be charged a higher usage fee than that charged to users that pay a reservation fee to make a reservation for resources for future usage periods.

The billing module 216 may track the usage, calculate appropriate fees, and bill the user and/or the authorized user (or provide billing information to an accounting module or service). In some cases, the request by the user may indicate that some or all of the usage fees incurred by authorized users be billed to the user rather than to the authorized users. In some such cases, the billing module 216 may appropriately portion the fees among the user and authorized users.

The capacity request manager 130 can be configured differently than illustrated in FIG. 2A. For example, various functionalities provided by the illustrated modules can be combined, rearranged, added, or deleted. In some embodiments, additional or different processors or modules may perform some or all of the functionalities described with reference to the example embodiment illustrated in FIG. 2A. Many implementation variations are possible.

Although described generally in terms of management of program execution capacity, in other embodiments, the capacity request manager 130 can be configured to manage additional or alternative types of computing-related resources for use by multiple users and to provide flexible guarantees for availability of these computing-related resources. These resources may include one or more of the following: persistent data storage capabilities (e.g., on non-volatile memory devices, such as hard disk drives); temporary data storage capabilities (e.g., on volatile memory, such as RAM); message queuing and/or passing capabilities; other types of communication capabilities (e.g., network sockets, virtual communication circuits, etc.); database management capabilities; dedicated bandwidth or other network-related resources; non-network bandwidth; input device capabilities; output device capabilities; CPU cycles or other instruction execution capabilities; etc.

Figure 2B:
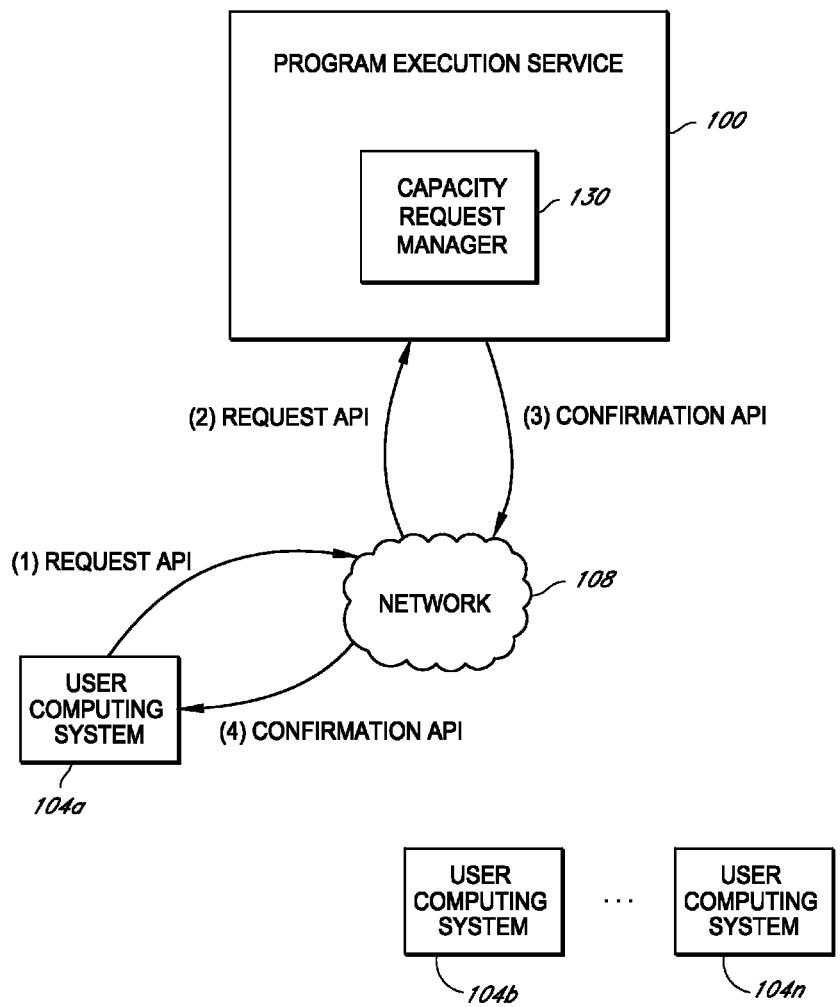
FIG. 2B is a network diagram schematically illustrating an example interaction between a user computing system and a capacity request manager of a program execution service.

FIG. 2B is a network diagram schematically illustrating an example interaction between a user computing system 104a and a capacity request manager 130 of a program execution service 100. The program execution service 100 can provide computing resources to multiple user computing systems 104a, 104b, . . . , 104n. In this illustrative example, the program execution service 100 provides an API for the user computing systems 104a, 104b, . . . , 104n to programmatically interact with the capacity request manager 130.

FIG. 2B illustratively shows the user computing system 104a communicating a request for guaranteed availability computing resources using a request API. The request API (1) is communicated via the network 108 and (2) is received by the capacity request manager 130 of the program execution service 100. The request API can include information about the user's request such as, e.g., the number and/or type of computing nodes, a minimum and/or maximum number of computing nodes to use, a usage period during which availability of the computing nodes is to be guaranteed, an expiration time for the request, etc. The request API can include other information about the request such as, e.g., preferences, requirements, and/or restrictions related to the user's needs for the guaranteed availability computing resources. For example, the request API can include information on which users are to be granted access to the computing resources during the usage period, which program (or programs) can be executed during the usage period, an amount of storage capacity or network bandwidth, geographical and/or logical location for the nodes, termination criteria, etc.

In the example shown in FIG. 2B, the capacity request manager 130 communicates a confirmation API (3) via the network 108 which is (4) received by the user computing system 104a. The confirmation API can include information related to whether the program execution service 100 can grant the request (in whole or in part) during the requested usage period (or during a different usage period). The confirmation API may also include one or more request identifiers (e.g., keys, tokens, user names, passwords, etc.) that are associated with the user's request and that are to be used in conjunction with accessing the guaranteed availability computing resources during the usage period. The confirmation API can include other information such as, e.g., information confirming that the user's preferences, requirements, and/or restrictions can be met.

FIG. 2B illustratively shows the user computing system 104a programmatically interacting via the API with the capacity request manager 130 of the program execution service 100. The program execution service 100 can receive requests for guaranteed availability of the service's computing resources from other user computing systems (e.g., user computing systems 104b, . . . , 104n) via the API and can communicate confirmations to the other user computing systems via the API (such requests and confirmations are not shown in the illustrative example in FIG. 2B). The capacity request manager 130 (or other suitable component) can schedule the requests from multiple user computing systems and can allocate guaranteed availability computing resources during the various requested usage periods. Other types of programmatic interactions (additionally or alternatively) between the program execution service 100 and the user computing systems are possible. For example, a request can be received directly from a user (e.g., via an interactive console or other GUI provided by the program execution service), from an executing program of a user that automatically initiates the execution of other programs or other instances of itself, etc.

Figure 3A:
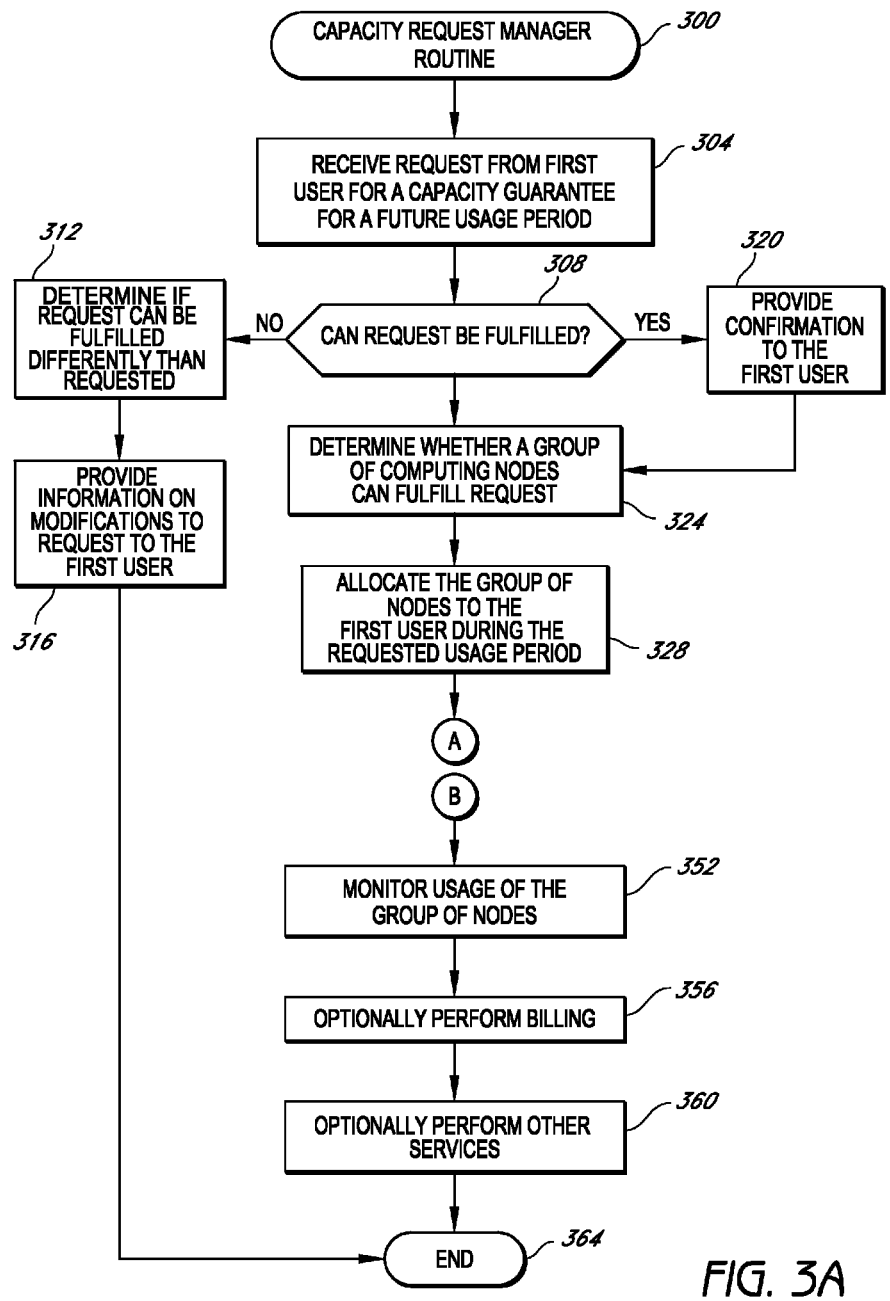
FIGS. 3A and 3B are flow diagrams illustrating a capacity request manager routine implemented by a capacity request manager component.
Figure 3B:
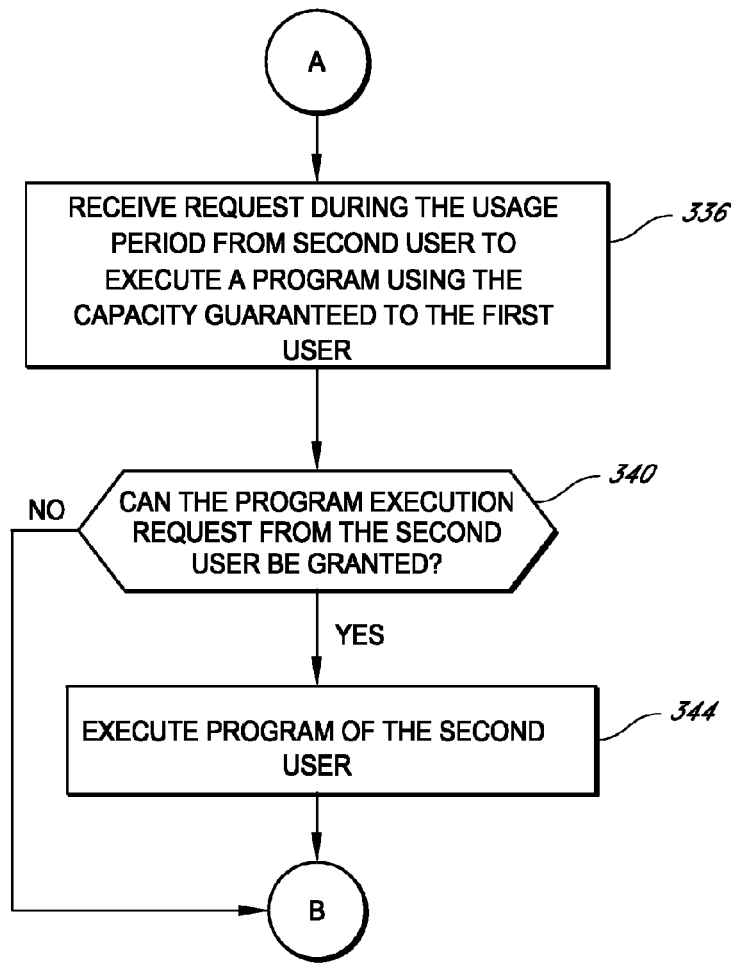

FIGS. 3A and 3B are flow diagrams that schematically illustrate an example embodiment of a capacity request manager routine 300. In some implementations, the routine 300 can be provided by embodiments of the capacity request manager 130 of the program execution service 100 described with reference to FIGS. 1 and 2. The example routine 300 is described in terms of a first user that makes a request for guaranteed availability program execution capacity, e.g., computing nodes, during a usage period (see, e.g., FIG. 3A), and a second user that requests during the usage period that a program be executed on the guaranteed availability program execution capacity (see, e.g., FIG. 3B). As will be discussed below, the first user and the second user need not be different users and may refer to the same user. The example routine 300 is intended to illustrate, but not to limit, various aspects of the capacity request manager 130.

With reference to FIG. 3A, at block 304, a request is received by the capacity request manager 130 from the first user for a guarantee of program execution capacity by the program execution service 100 in a future usage period. As discussed above, the request for guaranteed availability of computing resources may include a number and/or type of computing nodes, a minimum and/or maximum number of computing nodes to use, a future usage period during which availability of the computing nodes is to be guaranteed, an expiration time for the request, etc. The request may specify that only a certain user (or users) be granted access to the guaranteed availability computing nodes during the usage period or that only a certain program (or programs) be executed on the guaranteed availability computing nodes during the usage period. The request for guaranteed availability may include other types of preferences, requirements, and/or restrictions (e.g., amount of storage capacity or network bandwidth, geographical and/or logical location for the nodes, termination criteria, etc.).

At block 308, the capacity request manager 130 determines whether the request can be fulfilled. For example, in some cases, the program execution service 100 may have sufficient capacity to meet the request or the usage period is sufficiently far in the future that additional computing resources can be acquired (if needed). If the request can be fulfilled, at block 320 confirmation that the request can be fulfilled is provided to the first user. For example, a message may be communicated to the first user via electronic mail, or the program execution service may provide the confirmation via Web services or via an interactive console or other GUI provided by the program execution service. The confirmation may be provided via a confirmation API as discussed with reference to FIG. 2B.

If the request cannot be fulfilled, in whole or in part, the routine 300 continues to block 312 where the capacity request manager attempts to determine whether the request can be fulfilled, in whole or in part, differently than requested. For example, the routine 300 may determine that the request can be fulfilled during a different usage period or that the request can be fulfilled in part (e.g., with fewer nodes than requested) during the requested usage period. In some cases, the routine 300 at block 312 may determine that the request can be fulfilled during the requested usage period contingent on one or more additional events. For example, the routine 300 may determine that the request can be fulfilled contingent on sufficient additional computing resources being acquired by the program execution service and contingent on those additional resources being delivered and installed prior to the beginning of the requested usage period. At block 316, the routine 300 provides information to the first user regarding one or more possible modifications or contingencies related to the request and then the routine 300 ends. For example, a message may be communicated to the first user via electronic mail, or the program execution service may provide the information via Web services or via an interactive console or other GUI provided by the program execution service. The information may be provided via an API (see, e.g., FIG. 2B). The first user can use the information on the possible modifications or contingencies related to the request and then resubmit a new request if desired.

If the request can be fulfilled, the routine 300 continues to block 324 where the capacity request manager determines whether a group of computing nodes can fulfill the request. In various embodiments, the determination at block 324 is made at or near the time the request is granted by the program execution service. In other embodiments, the determination at block 324 is made at a later time, e.g., closer to the beginning of the usage period, so that the determination of the group of computing nodes can be made based on information that is then available. The number of computing nodes in the group of computing nodes may, but need not, be different from the number of computing nodes requested by the user. For example, the number of computing nodes in the group may be less than the requested number, because the program execution service has sufficient excess computing capacity in the event that the number of computing nodes actually requested during the usage period is greater than the number of computing nodes in the group. In other cases, the number of computing nodes in the group may be greater than the number requested to attempt to ensure that there will be enough computing nodes to safely meet anticipated demand during the usage period (e.g., to provide reserve nodes in case of failure of one or more of the computing nodes in the group). At block 328, the group of computing nodes is allocated for guaranteed availability of the first user during the usage period. As discussed above with reference to the resource scheduling module 208, the allocated group of computing nodes may comprise specific computing nodes or nodes selected from a computing node pool.

With reference to FIG. 3B, during the usage period, a second user may submit a request for execution of a program on the computing nodes that have been guaranteed to be available to the first user. As noted above, the second user may, but need not be, different from the first user. In one example scenario, the first user may have requested guaranteed availability of program execution capacity. During the usage period, the first user might submit a request for a program to be executed on the guaranteed availability computing nodes. In this example scenario, the second user would be the same as the first user. In some such scenarios, the request by the first user might indicate that only the first user (and no other users) have access to the guaranteed availability computing nodes during the usage period.

In other example scenarios, the second user may be a different user than the first user. For example, the request by the first user may indicate that a specific second user (or second users) is authorized to use the guaranteed availability computing nodes during the usage period. In this example scenario, the second user (or second users) can be different users than the first user. In another example scenario, the request by the first user might indicate that any user of the program execution service 100 can use the guaranteed availability computing nodes during the usage period as long as such a (second) user executes a specific program (or programs). In such a scenario, the first user might communicate an identifier to the specific program (e.g., a key, token, program name, password, etc.) to various second users. Any of these second users would then use the program identifier in making a request for program execution during the usage period. In some such scenarios, if a user requested access to the guaranteed availability computing nodes but did not have (or did not submit with the request) the program identifier, the capacity request manager would deny the request.

At block 336 the request for program execution from the second user is received by the capacity request manager. As discussed above, the program execution request may include various information to be used in the initiation of the execution of the program (or programs), such as, e.g., an identifier indicating the guaranteed availability computing resources on which a program is to be executed, an executable or other copy of a program to be executed, an indication of a program that was previously registered or otherwise supplied for execution (e.g., identified by a program identifier), and/or a number of instances of the program that are to be executed simultaneously (e.g., expressed as a single desired number of instances, as a minimum and maximum number of desired instances, etc.). The program execution request may specify a number and/or type of computing nodes for execution of a program, a minimum and/or maximum number of computing nodes to use, an expiration time for the request, a preferred execution time and/or time period of execution, etc. The program execution request may include other types of preferences and/or requirements for execution of one or more programs (e.g., resource allocation, geographical and/or logical location for execution, proximity of execution to other programs and/or computing nodes, timing-related criteria, termination criteria, etc.).

At block 340, the capacity request manager determines whether the program execution request from the second user can be granted or fulfilled. For example, the first user's request may have specified one or more requirements or restrictions to be placed on the guaranteed availability computing resources, and if the second user's request does not satisfy some or all of the requirements or restrictions, the second user's request may be denied. In other cases, all of the guaranteed availability computing nodes may already be in use, so that the second user's request cannot be fulfilled at the time of the second user's request. In such a situation, in various embodiments, the capacity request manager may deny the second user's request or may hold or queue the second user's request until sufficient computing nodes (from the guaranteed availability nodes) become free for use by the second user. In some implementations, the capacity request manager may provide information to the second user on an estimated time when the request can be fulfilled, how the request can be modified so that the request can be immediately fulfilled, etc.

At block 344, if the program execution request from the second user can be granted, the program execution service initiates execution of the program of the second user on one or more nodes of the guaranteed availability computing nodes.

With reference to FIG. 3A, the routine 300 continues at block 352 where the capacity request manager monitors and tracks usage of the group of nodes allocated for guaranteed availability. As discussed with reference to the monitoring and reporting module 212, the capacity request manager monitor usage patterns of users (e.g., the second user) executing programs on the guaranteed availability computing nodes. Usage patterns can include the number or identity of users accessing the guaranteed availability nodes, the start/end times and durations of program execution, and/or other user-specified patterns or diagnostics. In some embodiments, at block 352 interactive feedback may be provided to the first user or the second user including, e.g., indications of when and/or for how long programs may be likely to execute on the guaranteed availability computing nodes, actual or predicted demand for the guaranteed availability nodes, etc. In some embodiments, a report can be generated detailing or summarizing the usage statistics and provided to the first user via electronic mail or via an interactive console or other GUI provided by the program execution service.

In embodiments in which the program execution service is fee-based, at block 356 the capacity request manager (or other accounting or billing manager) can calculate one or more fees. For example, the first user may be charged a reservation fee for requesting the guaranteed availability computing capacity, and the second user (or second users) may be charged a usage fee for utilizing the guaranteed availability resources during the usage period.

At block 360, optionally other services can be performed by embodiments of the routine 300. For example, various housekeeping operations may be performed including freeing the guaranteed availability computing nodes for use by others after the expiration of the usage period. The routine 300 then continues to block 364 and ends.

Figure 3C:
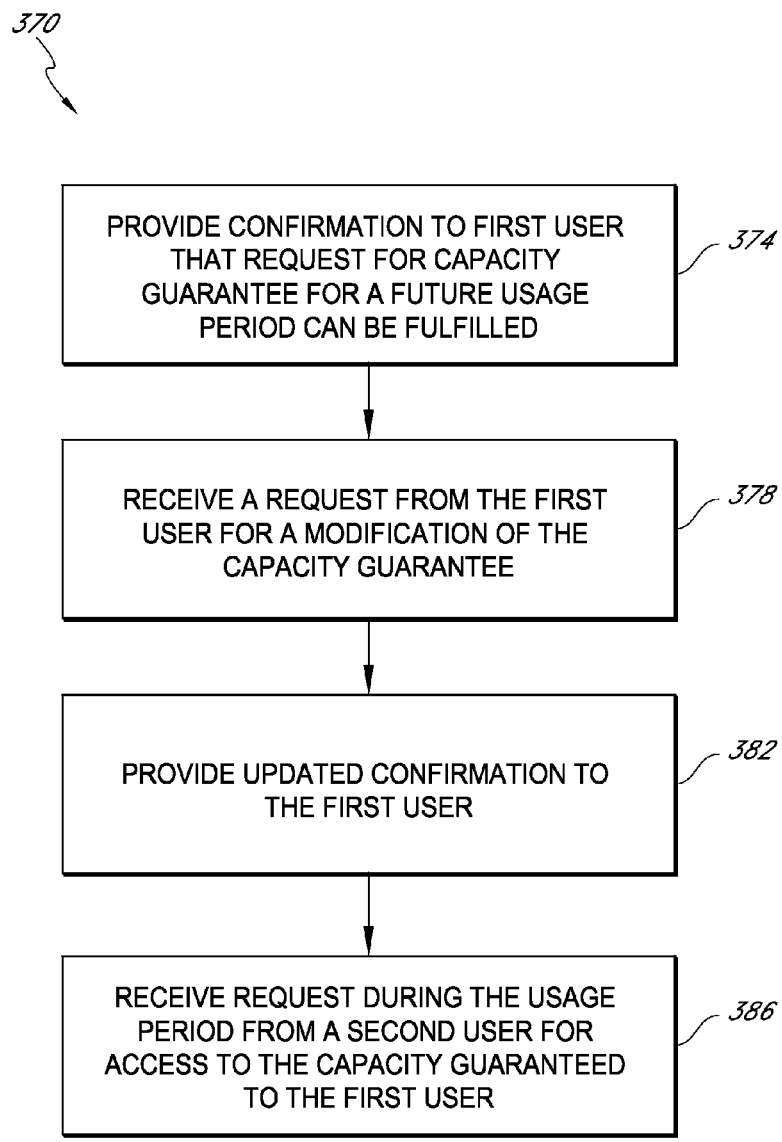
FIG. 3C is a flow diagram that schematically illustrates an example of a routine by which an embodiment of a capacity request manager can communicate with a user computing system for confirming requests for guaranteed computing resources.

FIG. 3C is a flow diagram that schematically illustrates an example of a routine 370 by which an embodiment of a capacity request manager can communicate with a user computing system for confirming requests for guaranteed computing resources. In some implementations, the routine 370 can be implemented by embodiments of the capacity request manager 130 of the program execution service 100 described with reference to FIGS. 1 and 2. As discussed with reference to blocks 304 and 308 of FIG. 3A, the capacity request manager can receive a request from a first user for a capacity guarantee for a future usage period and can determine whether the request for the capacity guarantee can be fulfilled.

Continuing at block 374 of FIG. 3C, if the request can be fulfilled, the capacity request manager provides a confirmation to the first user. For example, as discussed with reference to FIG. 2B and block 320 of FIG. 3A, the confirmation can include information related to whether the program execution service can grant the request (in whole or in part) during the requested future usage period (or during a different usage period). The confirmation may also include one or more request identifiers (e.g., keys, tokens, user names, passwords, etc.) that are associated with the first user's request and that are to be used in conjunction with accessing the guaranteed availability computing resources during the usage period. The confirmation can include other information such as, e.g., information confirming that the user's preferences, requirements, and/or restrictions can be met. In some implementations, the confirmation is communicated via a confirmation API (see, e.g., FIG. 2B).

In some cases, the capacity requirements of the first user may change between the time the request is confirmed (at block 374) and the beginning of the usage period. In some such cases, the first user may submit a modification of the request to the capacity request manager. For example, the modified request may include information on a modified number of computing nodes, a modified start time, termination time, and/or duration of the future usage period, or changes in other preferences or requirements of the first user. The modified request may be to cancel the initial request, in whole or in part. Accordingly, in such cases, at block 378 the capacity request manager may receive the modified request from the first user and determine whether the modified request can be fulfilled (in whole or in part).

At block 382, the capacity request manager provides an updated confirmation to the first user, which can include information related to whether the program execution service can grant the modified request (in whole or in part) during the requested future usage period (which may have been modified in the modified request) or whether the program execution service can grant the modified request (in whole or in part) during a different usage period. The updated confirmation may also include one or more updated request identifiers (e.g., keys, tokens, user names, passwords, etc.) that are associated with the first user's modified request and that are to be used in conjunction with accessing the guaranteed availability computing resources during the (possibly updated) future usage period. The updated confirmation can include other information such as, e.g., information confirming that the user's (possibly updated) preferences, requirements, and/or restrictions can be met. In some implementations, the updated confirmation is communicated to the first user via a confirmation API (see, e.g., FIG. 2B).

At block 386, the capacity request manager can receive a request during the usage period from a second user for access to the computing capacity guaranteed to the first user. The capacity request manager may process the request from the second user generally as described with reference to FIG. 3B. For example, in some implementations, the request received from the second user may include the request identifier for the guaranteed computing capacity that was communicated to the first user at block 374 (and/or at block 382 if a modified request was received from the first user).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The systems and modules may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computer-implemented method for managing requests for computing capacity provided by a program execution service, the method comprising:

under control of a program execution service that provides a plurality of computing nodes that are each configurable to execute one or more programs of multiple users of the program execution service, the program execution service comprising one or more physical computing systems, receiving from a first user of the program execution service a request to provide guaranteed availability of a number of computing nodes during a future period of time requested by the first user, the computing nodes guaranteed for availability by at least the first user during the future period of time requested by the first user;

automatically determining whether the request for guaranteed availability of the number of computing nodes during the future period of time can be satisfied in whole or in part by the program execution service;

providing the first user with information indicating whether the request for guaranteed availability of the number of computing nodes during the future period of time can be satisfied in whole or in part;

automatically determining from the plurality of computing nodes of the program execution service a group of computing nodes that can satisfy the request by the first user;

allocating the group of computing nodes for guaranteed availability by at least the first user during the requested period of time;

receiving, during the requested period of time, a request from a second user to execute a program on the group of computing nodes that have been allocated for guaranteed availability by at least the first user during the requested period of time; and initiating, during the requested period of time, execution of the program of the second user on at least one of the computing nodes of the group of computing nodes that have been allocated for guaranteed availability during the period of time requested by the first user.

2. The method of claim 1, wherein the request from the first user specifies that the requested number of computing nodes are to be made available only to the first user, and the method further comprises determining that the second user is the same as the first user prior to initiating execution of the program of the second user on at least one of the computing nodes of the group of computing nodes that have been allocated for guaranteed availability during the requested period of time.

3. The method of claim 1, wherein the request from the first user specifies that the requested number of computing nodes are to be made available for execution of a first program of the first user, and the method further comprises determining that the program of the second user is the same as or an instance of the first program of the first user prior to initiating execution of the program of the second user on at least one of the computing nodes of the group of computing nodes that have been allocated for guaranteed availability during the requested period of time.

4. The method of claim 1, wherein the requested period of time specifies an initial time in the future when guaranteed availability is desired to begin and an expiration time when guaranteed availability is desired to end.

5. A system configured to manage requests for computing capacity of a computing service, the system comprising:

a physical computer memory configured to store one or more program modules for managing requests for computing capacity of a computing service, the computing service comprising a plurality of computing nodes; and a capacity request manager configured to communicate with the physical computer memory and to execute the one or more program modules stored in the computer memory, the capacity request manager comprising one or more physical computing devices, the program modules configured to:
- receive a request from a first user for an amount of reserved computing capacity of the computing service that is guaranteed to be available to at least the first user during a user-selectable usage period that begins in the future;
- determine whether the request from the first user can be fulfilled in whole or in part during the user-selectable usage period by the plurality of computing nodes of the computing service; and
- provide information to the first user indicative of whether the request by the first user can be fulfilled in whole or in part.

6. The system of claim 5, wherein the plurality of computing nodes of the computing service comprise one or more physical computing systems.

7. The system of claim 6, wherein the plurality of computing nodes comprise one or more virtual machines hosted on the one or more physical computing systems.

8. The system of claim 5, wherein the usage period comprises a start time when the first amount of reserved capacity is requested to be available and an end time when the first amount of reserved capacity is no longer requested to be available.

9. The system of claim 8, wherein a duration between the start time and the end time is in a range from one hour to one week.

10. The system of claim 8, wherein a duration between the start time and the end time is less than one year.

11. The system of claim 5, wherein the amount of reserved computing capacity comprises an amount of at least one of: instruction execution capability, volatile memory, non-volatile data storage, network bandwidth, and non-network communication bandwidth.

12. The system of claim 5, wherein if the capacity request manager determines that the request from the first user cannot be fulfilled in whole or in part during the requested usage period, the program modules are further configured to determine whether the request can be fulfilled in whole or in part during a different usage period.

13. The system of claim 5, wherein if the capacity request manager determines that the request from the first user cannot be fulfilled in whole or in part during the requested usage period, the program modules are further configured to determine whether the request can be fulfilled in whole or in part with a different number of computing nodes than requested.

14. The system of claim 5, wherein the computing service provides an Application Programming Interface (API) for programmatically interacting with the computing service, and wherein the program modules are configured to receive the request from the first user for the amount of reserved computing capacity via the API.

15. The system of claim 5, wherein the computing service provides an Application Programming Interface (API) for programmatically interacting with the computing service, and wherein the program modules are configured to provide the information indicative of whether the request by the first user can be fulfilled in whole or in part to the first user via the API.

16. The system of claim 5, wherein the program modules are further configured to:
- allocate a group of the computing nodes of the computing service that can fulfill the amount of computing capacity reserved by the first user during the usage period;
- receive, during the usage period, a request from a second user for access to a portion of the group of computing nodes reserved by the first user; and
- grant the request from the second user if the portion of the group of computing nodes is available.

17. The system of claim 16, wherein the request by the first user specifies that the amount of reserved computing capacity is to be available for execution of a program of the first user, and the program modules are configured to grant the request from the second user only if the second user requests execution of the program or an instance of the program of the first user.

18. The system of claim 16, wherein the program modules are configured to grant the request from the second user for access to the portion of the group of computing nodes reserved by the first user only if such access would not exceed the amount of reserved computing capacity guaranteed to be available during the usage period.

19. The system of claim 16, wherein the program modules are further configured to initiate, during the usage period, execution of a program of the second user on at least one of the computing nodes of the group of computing nodes that have been allocated during the usage period.

20. The system of claim 19, wherein the program modules are further configured to terminate execution of the program of the second user after expiration of the usage period.

21. The system of claim 16, wherein the computing service is a fee-based service such that users pay one or more fees for use of the computing service, and wherein the program modules are further configured to:
- determine a first fee to be paid by the first user if the request from the first user can be fulfilled in whole or in part during the usage period by the plurality of computing nodes of the computing service; and
- determine a second fee to be paid by the second user based at least in part on duration of the second user's access to the portion of the group of computing nodes reserved by the first user.

22. The system of claim 16, wherein the program modules are further configured to monitor usage of the group of computing nodes reserved by the first user.

23. The system of claim 22, wherein the program modules are further configured to provide information related to the monitored usage to the first user or the second user.

24. The system of claim 5, wherein the program modules are further configured to:
- receive a modified request from the first user for (i) a modification of the amount of requested computing capacity, (ii) a modification of the requested usage period, or both (i) and (ii);
- determine whether the modified request from the first user can be fulfilled in whole or in part; and
- provide updated information to the first user indicative of whether the modified request can be fulfilled in whole or in part.

25. A computing system configured to manage execution of programs for users, the system comprising:
- a capacity request manager component that is configured to manage execution of programs for users of a program execution service, the capacity request manager component comprising one or more physical computing systems, the capacity request manager component configured to:
  - receive a request for a specified amount of computing capacity of the program execution service, the specified amount of computing capacity to be reserved for use by at least a first user during a specified usage period, the specified usage period occurring in the future and comprising a user-selectable duration that comprises a user-selectable start date and a user-selectable expiration date;

provide the first user with information indicating whether the request for the specified amount of computing capacity can be satisfied in whole or in part;

based at least in part on the information indicating whether the request for the specified amount of computing capacity can be satisfied in whole or in part, grant the request for the specified amount of computing capacity that is to be reserved for use by at least the first user during the specified usage period;

reserve a portion of the computing capacity of the program execution service for use by at least the first user during the specified usage period; and initiate, during the usage period, execution of a program on the reserved portion of the computing capacity on behalf of the first user or on behalf of a second user authorized by the first user.

26. The system of claim 25, wherein the user-selectable duration is in a range from one hour to one week.

27. The system of claim 25, wherein the user-selectable duration is in a range from one week to six months.

28. The system of claim 25, wherein the user-selectable start date occurs at a time that exceeds the time the request is received or granted by the capacity request manager by at least a delay period.

29. The system of claim 28, wherein the delay period is representative of request processing operations performed by the capacity request manager or the program execution service.

30. The system of claim 28, wherein the delay period is at least one day.

31. The system of claim 25, wherein the request indicates that a specified program or instance of the specified program is to be executed on the specified amount of computing capacity of the program execution service during the usage period, and the capacity request manager component is further configured to initiate execution only of the specified program or an instance of the specified program on the reserved portion of the computing capacity during the usage period.

32. The system of claim 25, wherein the capacity request manager component is configured to grant the request for the specified amount of computing capacity if the capacity request manager component determines the program execution service has sufficient current computing capacity to satisfy the request for the specified amount of computing capacity.

33. The system of claim 25, wherein the capacity request manager component is configured to grant the request for the specified amount of computing capacity if the capacity request manager component determines that the program execution service can acquire sufficient computing capacity to satisfy the request for the specified amount of computing capacity prior to the requested usage period.

* * * * *